(12) United States Patent
Plate et al.

(10) Patent No.: US 9,191,304 B1
(45) Date of Patent: Nov. 17, 2015

(54) REINFORCEMENT LEARNING-BASED DISTRIBUTED NETWORK ROUTING METHOD UTILIZING INTEGRATED TRACKING AND SELECTIVE SWEEPING

(71) Applicant: The United States of America as represented by the Secretary of the Navy, Washington, DC (US)

(72) Inventors: Randall S. Plate, San Diego, CA (US); Cherry Y. Wakayama, Poway, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 358 days.

(21) Appl. No.: 13/964,197

(22) Filed: Aug. 12, 2013

(51) Int. Cl.
*H04L 12/28* (2006.01)
*H04L 12/751* (2013.01)

(52) U.S. Cl.
CPC ..................................... *H04L 45/08* (2013.01)

(58) Field of Classification Search
None
See application file for complete search history.

(56) References Cited

U.S. PATENT DOCUMENTS

| | | | | |
|---|---|---|---|---|
| 8,644,267 B2 * | 2/2014 | Sato | ................ | H04W 28/065 370/310 |
| 2009/0138415 A1 * | 5/2009 | Lancaster | ................ | G06N 5/04 706/11 |
| 2013/0187787 A1 * | 7/2013 | Damus | ................ | H04B 13/02 340/850 |

OTHER PUBLICATIONS

D. Pompili and I.F. Akyidiz, Overview of networking protocols for underwater wireless communication. IEEE. Commun. Mag., Feature Topic on Underwater Wireless Communications, Jan. 2009.
C. Ma and Y. Yang, Battery-aware routing for steaming data transmissions in wireless sensor networks. In Proc. Intl. Symp. Mobile Ad hoc Networking & Computing, pp. 230-241, 2005.
P. Xie, J.H. Cui, and L. Lao, VBF: Vector-based forwarding protocol for underwater sensor networks. In Proc. Networking, pp. 1216-1221, 2006.
H. Yan, J. Shi, and J.H. Cui, DBR: Depth-based routing for underwater sensor networks. In Proc. Networking, pp. 72-86, 2008.

(Continued)

*Primary Examiner* — Hassan Phillips
*Assistant Examiner* — Gautam Sharma
(74) *Attorney, Agent, or Firm* — SPAWAR Systems Center Pacific; Kyle Eppele; Ryan J. Friedl (57) ABSTRACT

A reinforcement learning-based method is provided that enables efficient communication for networks having varying numbers and topologies of mobile and stationary nodes. The method provides an autonomous, optimized, routing method that may be implemented in a distributed manner among the nodes that allows the nodes to make intelligent decisions of how to forward data from a source node to a destination node with little or no a priori information about the network. The method involves receiving, at a node within a distributed network, data packets containing position and velocity information from a transmitting node. Position and velocity estimates are determined for the transmitting and receiving nodes using the position and velocity information. State-action pair value estimates are determined in the destination direction for forward packets and the source direction for backward sweeping packets, along with associated destination direction and source direction state value estimates, which determine packet transmittal.

7 Claims, 7 Drawing Sheets

(56) References Cited

OTHER PUBLICATIONS

T. Hu and Y. Fei, QELAR: A machine-learning-based adaptive routing protocol for energy-efficient and lifetime-extended underwater sensor networks. IEEE Trans. Mobile Computing, 9(6):798-809, Jun. 2010.

S. Kumar and R. Miikkulainen, Dual reinforcement q-routing: An on-line adaptive routing algorithm. In Proc. Articial Neural Networks in Eng. Conf., 1997.

J. Broch, D.A. Maltz, D.B. Johnson, Y. Hu, and J. Jetcheva. A performance comparison of multi-hop wireless ad hoc network routing protocols. Proc. of IEEE International Conference on Mobile Computing and Networking, Oct. 1998.

P. Xie, Z. Zhou, Z. Peng, H. Yan, T. Hu, J. Cui, Z. Shi, Y. Fei, and S. Zhou. Aqua-sim: An ns-2 based simulator for underwater sensor networks. Oceans 2009, MTS/IEEE Biloxi—Marine Technology for Our Future: Global and Local Challenges, Oct. 2009.

M. Chitre, S. Shahabudeen, L. Freitag, and M. Stojanavic. Recent advances in underwater acoustic communications and networking. In Proc. MTS/IEEE Oceans, Quebec City, Canada, Sep. 2008.

I. F. Akyidiz, D. Pompili, and T. Melodia. State of the art in protocol research for underwater acoustic sensor networks. In Proc. Sigmobile—Mobile Computing Comm. Rev., vol. 11, pp. 11-22, 2007.

J. A. Boyan and M. L. Littman. Packet routing in dynamically changing networks: A reinforcement learning approach. In Proc. Advances in Neural Information Processing Systems, vol. 6, pp. 671-678, 1994.

\* cited by examiner

REINFORCEMENT LEARNING-BASED DISTRIBUTED NETWORK ROUTING METHOD UTILIZING INTEGRATED TRACKING AND SELECTIVE SWEEPING

FEDERALLY-SPONSORED RESEARCH AND DEVELOPMENT

The Reinforcement Learning-Based Distributed Routing Method for Underwater Networks Utilizing Integrated Tracking and Selective Sweeping is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 102077.

BACKGROUND

Routing packets among unmanned nodes is a critical component of underwater networks, the operation of which is complicated by the harsh underwater environment characterized by low bandwidth, large latency, high energy consumption, and node mobility. Nodes must be able to relay information throughout the network in an efficient manner and adapt autonomously to topology changes. Previous methods of addressing the underwater routing issue have relied on limiting assumptions, such as that all nodes know the locations, link costs, etc., of all other network assets. Other methods limit their application to homogeneous networks, networks without mobile nodes, small networks, or centralized architectures.

Accordingly, it is desirable to provide a method for routing packets among unmanned nodes within networks composed of varying numbers and topologies of both mobile and stationary nodes.

DETAILED DESCRIPTION OF SOME EMBODIMENTS

The embodiments of the method enable efficient communication for underwater networks composed of varying numbers and topologies of both mobile and stationary nodes. The embodiments of the method provide an autonomous, optimized, routing method that is implemented in a distributed manner among the nodes that allows nodes to make intelligent decisions of how to forward data from a source node to a destination node with little or no a priori information about the network.

The embodiments of the method discussed herein address the routing problem—determining which node to forward data packets to in order to reach the destination in an efficient manner—by employing a combination of proactive, reactive, and geographic routing techniques. The method is based on a Reinforcement Learning (RL) framework, which lends itself well to discovering unknown environments and using the resources available in an optimized way, without user intervention. The method also adapts to changes in the network environment due to factors such as node mobility.

Figure 1:
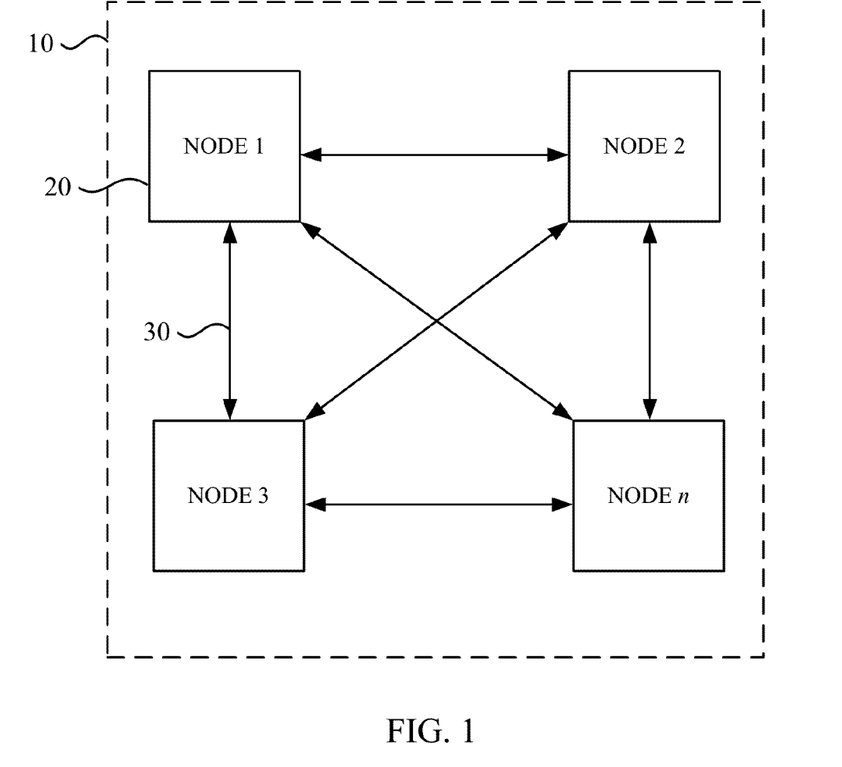
FIG. 1 shows a block diagram of an embodiment of a system having a distributed network architecture that may be used to implement methods in accordance with the Reinforcement Learning-Based Distributed Routing Method for Underwater Networks Utilizing Integrated Tracking and Selective Sweeping.

FIG. 1 shows a block diagram of an embodiment of a system 10 having distributed network architecture that may be used to implement methods in accordance with the Reinforcement Learning-Based Distributed Routing Method for Underwater Networks Utilizing Integrated Tracking and Selective Sweeping. System 10 may include a plurality of nodes 20 that are each configured to send signals 30 to each of the other nodes 20 and receive signals 30 from each of the other nodes 20. Nodes 20 may be organized in any type of distributed network configuration. In some embodiments, nodes 20 are fixed in their location within the network. In some embodiments, nodes 20 are mobile and are able to move about within the network. In some embodiments, system 10 may include both fixed and mobile nodes. In some embodiments, nodes 20 comprise sensors that may be used to detect objects within an environment.

Figure 2:
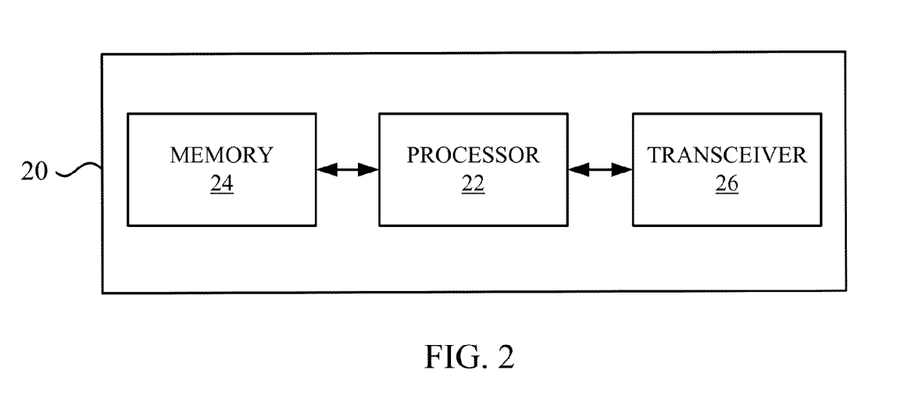
FIG. 2 shows a block diagram of an embodiment of a node shown in FIG. 1.

FIG. 2 shows a block diagram of an embodiment of a node 20. As shown, node 20 includes a processor 22 operatively connected to a memory unit 24 and a transceiver 26. In some embodiments, processor 22 is a general purpose processor. In some embodiments, processor 22 is a processor that is specifically programmed to contain instructions therein, readable by the processor, that allow the processor to send/receive information from memory unit 24 and transceiver 26, as well as to cause transceiver 26 to send/receive signals in accordance with the embodiments of the method discussed herein. Further, depending on the particular application of the node, i.e. a sensor, node 20 may include more components therein to allow the node to perform functions required by the specific application.

The embodiments of the method disclosed herein use a basic RL approach to discover the network and improve its routing decisions. The RL scheme learns and constantly updates estimates of the network topology and characteristics, and uses this information to choose packet routes. In some embodiments, the method includes a geographic component in which nodes include their position and velocity information in packet headers. A tracking algorithm running at each node, such as stored within memory unit 24 and accessed and run by processor 22, updates these estimates over time to avoid constant need for position-velocity transmission, while maintaining good estimates of the geographic state of neighboring nodes. Additionally, some embodiments of the method include a selective sweeping component that promotes the transfer of information about significant changes in the network back to the source node quickly. This further helps to maintain accurate estimates of the network, while minimizing overhead costs. The method may be implemented using both of these features, or either one individually.

The first unique aspect of the method is the inclusion of a geographic component to the RL routing decision by passing kinematic information among nodes and performing tracking at each node to maintain good estimates of neighbor positions. Use of a geographic component results in a more accurate model of the network, and thus better decisions can be made. When employing this feature, nodes have a method of estimating their own position and/or velocity, such as GPS (e.g. surface buoys), inertial navigation systems (e.g. UUVs), or acoustic localization using neighbor nodes. Neighbor nodes combine new measurements from received packets with existing estimates using a tracking algorithm. A robust tracking scheme reduces the frequency of position/velocity transmissions, yet maintains a high level of network model accuracy.

Another unique aspect of the method is an implementation of selective sweeping. The selective sweeping feature results in more efficient sharing of node information through the network by actively propagating the most significant changes to the most significant nodes (those near the source) as quickly as possible. Sharing this information in a selective manner results in improved accuracy of network estimates by the nodes that matter the most while minimizing the overhead costs (energy, time, etc.) incurred.

The embodiments of the method described herein may be used in various applications, such as for underwater communications using acoustic transmissions. The method may also be used for multi-modal communications (e.g. optics), in which case the method would determine the best mode to use in addition to the routing decision it already makes.

Regarding implementation, the method addresses the packet routing task and must be combined with the other layers of the network protocol (physical hardware, MAC schemes, etc.) to form a functional system. The method is not specific in this regard, and different combinations can be combined to suit the application needs, as would be recognized by one having ordinary skill in the art, without departing from the scope of the system and methods discussed herein.

The embodiments of the method disclosed herein, employing the features of tracking using neighbor node kinematic information and prioritized sweeping based on changes in V value estimates, demonstrate faster convergence and better estimates of dynamic networks than a baseline algorithm, QELAR, which is described in a publication by Hu, T. et al, "QELAR: A Machine-Learning-Based Adaptive Routing Protocol for Energy-Efficient and Lifetime-Extended Underwater Sensor Networks", *IEEE Trans. Mobile Computing*, 9(6): 796-809, June 2010. QELAR is a routing algorithm based on Q-learning. While increased overhead energy costs may be incurred using the method discussed herein, the benefits significantly outweigh these costs and result in both decreased transmission errors as well as energy usage.

Some embodiments of the method include a stochastic node motion model such that nodes will maintain estimates not only of position and velocity of their neighbors, but also uncertainties of these quantities. In some embodiments, a localization scheme is included in order to provide a mechanism for nodes to create a network without being initialized with any information of other nodes.

Effective utilization of mobile ad-hoc underwater distributed networks is very challenging due to high system costs and the harsh environment characterized by low bandwidth, large latency, high energy consumption, and node mobility. The embodiments of the method address the routing issue, which is critical in successfully establishing and utilizing an underwater network. In particular, focus is placed on the RL-based routing method, which possesses the ability to explore the network environment and adapt routing decisions to the constantly changing topology of the network due to node mobility and energy usage.

As an example, the method may begin with a baseline implementation of QELAR. Although QELAR adapts to the network topology, the rate of convergence may be unacceptable for certain scenarios such as networks comprised of a large number of nodes and/or nodes with high mobility, resulting in excess resource usage.

Additional features that can improve the convergence rate and ability to track changes in the network include the use of kinematic information of the neighbor nodes and selective backward exploration. The results of network simulations using NS-2 are presented which compare the energy usage, convergence, and delivery performance of an RL algorithm with these two additional features to the baseline method on networks with both fixed and mobile nodes.

Conventional routing protocols developed for ad hoc networks can be classified into three different categories: table-based proactive, on-demand reactive, and geographical. Each of these categories has inherent weaknesses in underwater environments: route discovery and maintenance in both proactive and reactive routing protocols are costly, and accurate position information of the destination node is difficult to maintain for use in geographical protocols. Additionally, many existing works on routing protocols specifically for underwater networks depend on various assumptions and limiting scenarios. For example, battery-aware routing protocol assumes geographical information is known at each node, vector-based-forwarding protocol assumes a static network, and depth-based-routing protocol assumes that the packets only need to be delivered from the bottom to the surface. Combining the strengths of the three basic approaches can produce a more robust routing approach.

The QELAR algorithm can be considered as a hybrid of proactive and reactive protocols. In QELAR, nodes compute their own routing decisions by storing routing information (Q values) of their direct neighbor nodes. Also, the Q-value estimates consider the energy consumption and residual energy distribution among neighboring nodes to optimize total energy consumption and network lifetime. The environment is learned as the estimated Q-values converge to reflect the network topology. However, convergence could occur slowly for certain network configurations.

Described herein are two additional features that can improve the convergence rate of the Q-learning algorithm and ability to track changes in the network while balancing the routing overhead. The first is the use of kinematic information in which nodes transmit their own position and velocity estimates and store those of their neighbors to enable more accurate tracking of neighbor node positions, and therefore fewer failed transmissions. In some embodiments, each node is provided the capability to estimate its own position and velocity, but is unaware of the destination location of the data packet.

The second additional feature is the addition of selective backward exploration to the forward exploration of QELAR, such that nodes actively propagate significant changes in their Q values back toward the source or transmitting node. Although exploration overhead is increased with the addition of each feature, the improved convergence rate and tracking of network changes results in an overall improvement in energy consumption and/or latency as compared to the baseline Q-routing approach. An objective is to understand the trade-offs achievable when employing these algorithms in different network scenarios so that the best features/parameters can be chosen for maximal efficiency. These two features are not dependent on each other, and the algorithm can be implemented with both together, or either one separately.

The sequential routing decision system can be modeled as a Markov Decision Process (MDP). The MDP is characterized by its state set, action set, dynamics (set of state transition probabilities), and expected immediate cost. Let $s_t$ and $a_t$ denote a state and action (decision), respectively, at time t. For the underwater network system, the state represents the location of the packet in the network and the action represents which of the one-hop neighbor nodes of s to which the data packet is forwarded. Let $P_{s_t s_{t+1}}^{a_t}$ denote the probability of going from the current state, $s_t$, to the next state, $s_{t+1}$, when taking action at $a_t$; $R_{s_t s_{t+1}}^{a_t}$ is the expected immediate cost for taking action $a_t$ at state $s_t$ and arriving at state $s_{t+1}$. Cost may include energy usage, network lifetime, delay, and congestion depending on the mission operational objectives. The objective is to minimize the expected sum of costs of actions leading from the source or transmitting node to the destination node.

According to Bellman's principle of optimality in Dynamic Programming, the optimal solution can be obtained once the optimal value functions are found. Value functions are functions of the states that provide a measure of how good it is to be in a given state (V), or of state-action pairs that estimate how good it is to perform a given action in a given state (Q). Optimal value functions, V* and Q*, satisfy the Bellman equations:

$$V^*(s_t) = \min_{a_t} \Sigma_{s_{t+1}} p_{s_t s_{t+1}}^{a_t} [R_{s_t s_{t+1}}^{a_t} + \gamma V^*(s_{t+1})],$$ (Eq. 1)

$$Q^*(s_t, a_t) = \Sigma_{s_{t+1}} p_{s_t s_{t+1}}^{a_t} [R_{s_t s_{t+1}}^{a_t} + \gamma \min_{a_{t+1}} Q^*(s_{t+1}, a_{t+1})],$$ (Eq. 2)

where $0 \leq \gamma \leq 1$ is a parameter that determines how important future costs are. The relation between V* and Q* is given by:

$$V^*(s_t) = \min_{a_t} Q^*(s_t, a_t).$$ (Eq. 3)

Value functions evaluated at given states (V) are referred to as V values, while functions evaluated as state-action pairs (Q) are referred to as Q values. For mobile ad hoc underwater networks, where the system model of future behavior is not known at each node the optimal value functions are not known a priori, and also change as the network changes. In this situation, methods of estimating the optimal value functions must be employed to find good routing decisions. Q-learning is a reinforcement learning method which iteratively approximates Q*.

In QELAR, the Q values represent the estimated cost (based on energy usage) for a packet to reach the destination node from the neighboring nodes. Nodes use Eq. (2) to evaluate neighbor node Q values and choose the neighbor with the minimum Q value (Eq. (3)). Transition probabilities of neighbors are estimated based on the success/failure history of a node's forwarding actions. The cost function considers the initial node energy, residual energy, and the energy distribution of the neighboring nodes to balance choosing short paths with maximizing network lifetime. When nodes overhear neighboring forwarding transmissions, they use the information obtained to update estimates of their neighbors' V values. In order to keep up with changing network topology, nodes also periodically transmit header-only packets with their V values to neighbors. Thus, a combination of virtual experiments (iterating Eq. (2)) and actual observation (overhearing neighbor transmissions) are employed to make routing decisions.

For networks comprised of nodes with high mobility, QELAR requires frequent periodic pinging to allow nodes to update their P and V estimates; inaccurate estimates result in many transmission failures and therefore energy waste. As an approach to compensate for this issue and improve the ability to predict state transition probabilities and enhance V estimate convergence, the method discussed herein utilizes neighbor kinematic data (position and velocity) and selective sweeping.

Although QELAR's scheme of learning transition probabilities from the success/failure rate of its history of forwarding actions can be effective for static networks, the mismatch between estimates and the actual environment can become significant for networks with high mobility, resulting in increased transmission failure rate. In order to have a better system model for networks with mobile nodes, the kinematic state of the neighbor nodes is utilized. Along with their V values, nodes include their kinematic states (position and velocity) in transmitted packet headers so that their locations can be better tracked by their neighbors. In some embodiments, each node knows its own kinematic state, but not that of the data packet destination, as required in geographic routing. As an example, some mobile nodes may get this information from on-board navigation systems (AUV/UUVs) or access to GPS signals (buoys). For nodes that are drifting with currents and do not such navigation capabilities, a localization algorithm may be installed that is based on communications with neighbor nodes.

Figure 3:
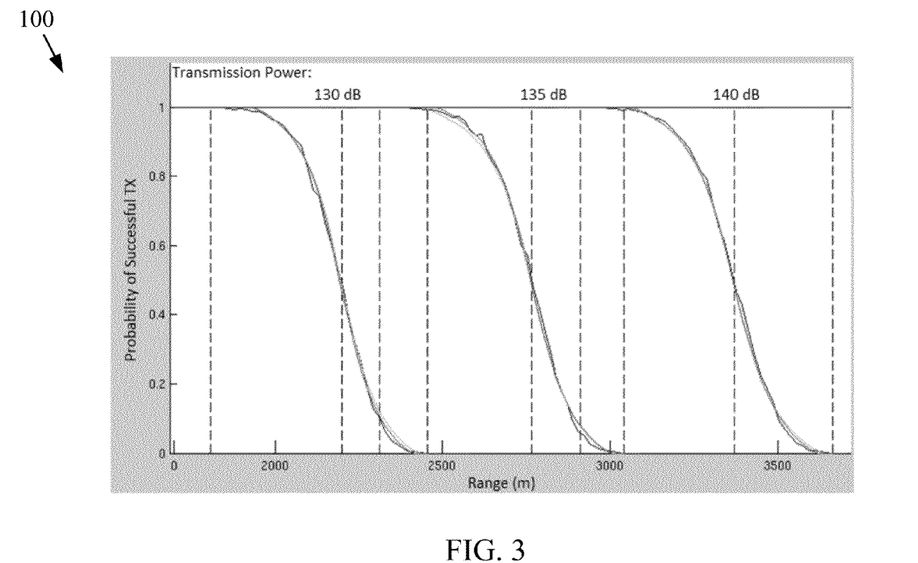
FIG. 3 shows a graph illustrating the modeled probability of successful data packet transmission as a function of node distance and transmission power.

In some embodiments, nodes can employ a propagation model of the medium (either known a priori, or learned) to estimate the probability of successful transmission to its neighbors based on distance. FIG. 3 shows an example of such a model that could be used. This model was developed using Monte Carol runs of the NS-2 simulator to estimate probability of transmission success as a function of distance for various transmission power levels. A generic model of probability of success was then derived based on a shifted, scaled arctangent function that accepts transmission power and range as parameters. Other models could be developed and used based on such features as the environment and source radiation characteristics.

Selective backward sweeping centers around the concept of actively propagating changes in nodes' V values (due to learning or movement) back toward the source rather than waiting for them to percolate backward as a natural product of forwarding packets. Each time a node receives or overhears a neighbor's transmission, it updates its own estimate of that node's V value. However, instead of waiting until its next transmission time to compute its own V value, it does so immediately and compares its change in V value, $\delta V$ to a predefined threshold, $\theta$. If $\delta V > \theta$, it initiates forwarding a header-only packet with its updated information so that its neighbors have access to this information.

To control the spreading of backward sweeping packets, an additional set of V values are maintained at each node corresponding to the estimated minimum cost of going backward to reach the source node: thus, $Q^s$ ($V^s$) and $Q^d$ ($V^d$) denote the Q values (V values) associated with the source and destination, respectively. The 'selective' aspect of the approach is implemented by including a prioritized list of nodes in each packet header that indicates which ones are allowed to initiate backward packets. The nodes are chosen according to minimum $V^s$ value, which results in the backward packets being steered toward the source node. Thus, the header of each packet now includes the node's estimate of $V_t^s$ in addition to $V_t^d$, and also a list of backward forwarder ID's (see Table 1 below). A depth parameter is included which defines how many nodes to select as backward forwarders at each transmission.

The NS-2 network simulator was used to implement both the baseline and modified algorithms. Several extensions have been leveraged to make use of existing underwater modeling (DESERT and WOSS) as well as NSMIRACLE to support modularization of the code.

Figure 9:
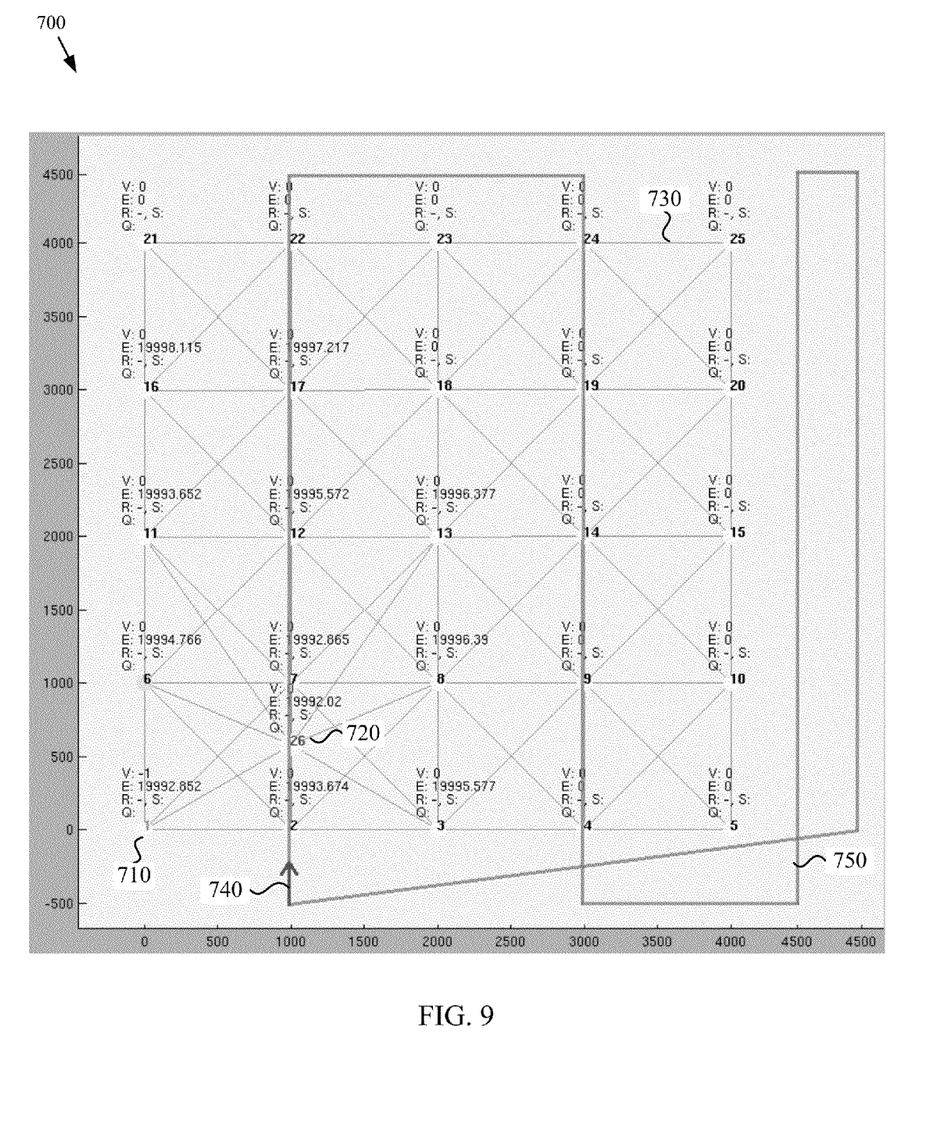
FIG. 9 shows a diagram illustrating an example field layout of an underwater sensor network including a mobile node.

While multiple sources/destinations could exist in the simulator, the results discussed herein include a single source and a single destination. The source node generates packets using the constant bit-rate (CBR) module provided in the DESERT framework which produces packets at random times at a specified average period, which has been set to 60 seconds. Two different scenarios are run, one with a stationary destination (node 25), and one with a mobile destination (node 26), an example of which is a an unmanned underwater vehicle (UUV). The remaining nodes, aside from the mobile node, are organized in a grid pattern with 1 km spacing as shown in FIG. 9. FIG. 9 shows a diagram 700 illustrating an underwater sensor network including 26 nodes, including a source node (1) 710 and a destination node (26) 720. Lines 730 between the nodes represent node connections having probabilities of success greater than 0.5. As shown, a mobile node 740, such as a UUV, starts at position (1000, −500) and follows a path such as path 750 shown.

An energy module has been developed to record energy usage at each node. It models the transmission, receiving, and idle power levels to be 10 W, 3 W, and 0.03 W, respectively, and deducts energy from an initial available amount (e.g. 10 kJ) as nodes spend periods of time in each of these states. The simulation continues for a specified period of time, 10,000 seconds (2.7 hours) in this case.

Packets consist of a header and a payload. Header fields depend on the algorithm implemented (see Table 1 below) and serve to direct the packet along its path and relay routing information among nodes. The size of the header is estimated by allowing one byte for each field that is a node ID (enabling 256 nodes to be present in the network) and two bytes for each numerical value. The payload section contains the actual data being transmitted by the source and is fixed at 200 bytes for all packets.

TABLE 1

| Field | Bytes | Q | T | S |
|---|---|---|---|---|
| Packet ID | 1 | x | x | x |
| Dest Node ID | 1 | x | x | x |
| Sender Vd | 2 | x | x | x |
| Energy (res) | 2 | x | x | x |
| Energy (avg) | 2 | x | x | x |
| Prev Hop Node ID | 1 | x | x | x |
| Next Forwarder ID | 1 | x | x | x |
| Sender Pos | 6 |  | x |  |
| Sender Vel | 6 |  | x |  |
| Sender Vs | 2 |  |  | x |
| Next Backward ID | 3* |  |  | x |

Table 1 shows packet header fields for QELAR (Q), an embodiment of the method disclosed herein with kinematic tracking only (T), and an embodiment of the method disclosed herein with backward sweeping only (S).

Table 2 illustrates metrics that have been computed to compare algorithm performance under both static and mobile scenarios. Results are shown for four configurations of the modified algorithm, which we will refer to as QKS (Q-learning utilizing Kinematics and sweeping): tracking only, selective sweeping with depths of 1 and 3, and uniform sweeping. 'Total Energy' is the sum of all energy consumed by all nodes during the simulation. 'Total TX' and 'Failed TX' are the total transmissions of all nodes, and the number of transmissions that failed to reach their intended next hop, respectively. 'Sweep TX' denotes the number of transmissions initiated as part of the selective sweeping functionality (QKS) and 'Periodic TX' is the number of periodic transmissions (QELAR). 'Avg Path Len' is the average path length considering all paths from source to destination used by packets during the simulation. A Monte-Carlo simulation mode has been employed, where identical node configurations are used, but the random aspects of the simulation will vary (e.g. packet errors due to noise, packet transmission times, etc.). Each algorithm is run many times and the results averaged to provide a more representative result.

TABLE 2

| | Algorithm | | | | | | | |
|---|---|---|---|---|---|---|---|---|
| | QELAR | | | QKS - T Only | | QKS - T & S(1) | QKS - T & S(3) | QKS - T & S(U) |
| Dest Vel (m/s) | 0 | 2 | 2 | 0 | 2 | 2 | 2 | 2 |
| Total Energy (J) | 20614 | 51716 | 46333 | 20100 | 30148 | 29454 | 27675 | 26381 |
| Total TX | 1414 | 4146 | 3601 | 1361 | 2141 | 2068 | 1923 | 1847 |
| Failed TX | 357 | 2658 | 2128 | 326 | 892 | 854 | 769 | 678 |
| Sweep TX | 0 | 0 | 0 | 0 | 0 | 13.9 | 24.2 | 31.4 |
| Periodic TX | 0 | 0 | 42.1 | 0 | 0 | 0 | 0 | 0 |
| Avg Path Len | 6.7 | 23 | 19.3 | 6.5 | 10.4 | 10 | 9.7 | 8.6 |

From Table 2, it is observed that both algorithms show similar performance in the static case. In this scenario, QELAR is able to estimate and maintain sufficiently accurate estimates of successful transmission probabilities (P values) along the path to the destination as they remain constant over time, and the V values change only gradually due to energy usage. Thus, the extra overhead of QKS does not result in usage. Thus, the extra overhead of QKS does not result in much improvement, although it does show slight benefit due to the geographic information providing more accurate/immediate P value information.

The mobility case is more challenging and decreases in performance are seen in both algorithms, however the effect on QELAR is much more significant, where a total energy increase of approximately 2.5 times is seen, with failed transmissions increasing by a factor of over 7. Comparatively, QKS increased by only about a factor of 1.5 with respect to total energy, and failed transmissions less than tripled. This demonstrates the advantage of using geographic information in the mobile node case: the tracking component of the QKS algorithm allows nodes to maintain accurate estimates of the UUV, resulting in better estimates of P values. This, in turn, produces better routing decisions and therefore fewer failed transmissions and significantly less energy used.

Three columns are shown under the QELAR heading: the first corresponds to the static scenario and the second and third both correspond to the mobile scenario. Column two describes a configuration where periodic transmissions were not used, whereas in column three periodic transmissions were configured to be initiated after 2000 seconds of a node not having transmitted. This offers some improvement, as the mobile node will now transmit its information more frequently, but it still suffers considerably compared to even the modified algorithm with tracking only. More frequent periodic transmissions resulted in more energy usage overall. Adding various levels of selective sweeping to the modified algorithm reveals further reductions in both failed transmissions and total energy used.

It is observed that the selective sweeping is more efficient in that fewer sweeping transmissions are made as compared to the periodic transmissions made by QELAR due to the fact that they are triggered based on changes in V value, not simply time. It is noted that the simulation involves "uniform" sweeping, where instead of selectively choosing nodes with the minimum V values in the direction of the source node, all neighbors are allowed to transmit sweeping packets. This is therefore the upper limit on the amount of sweeping that can be performed.

Figure 4:
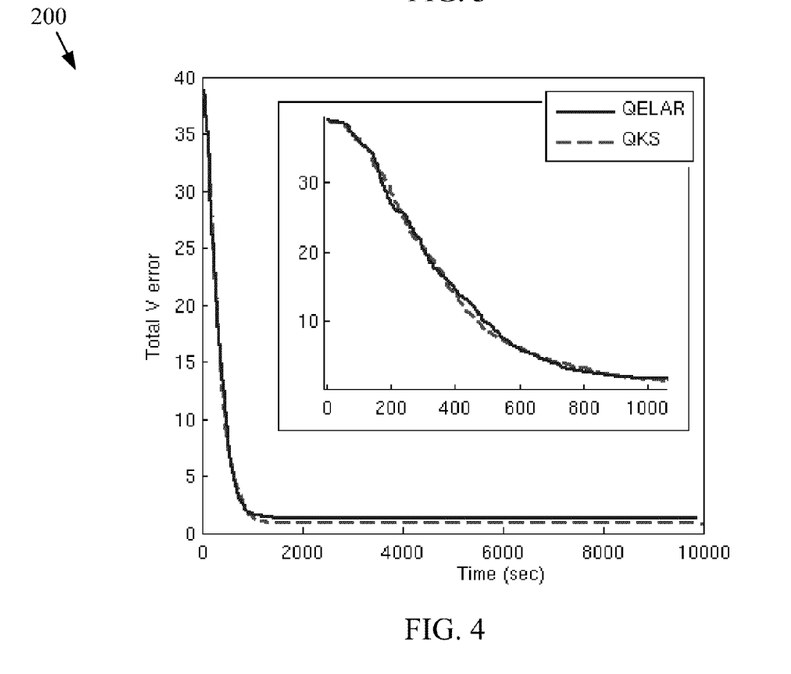
FIG. 4 shows a graph illustrating V value error for various methods for a static node scenario.
Figure 5:
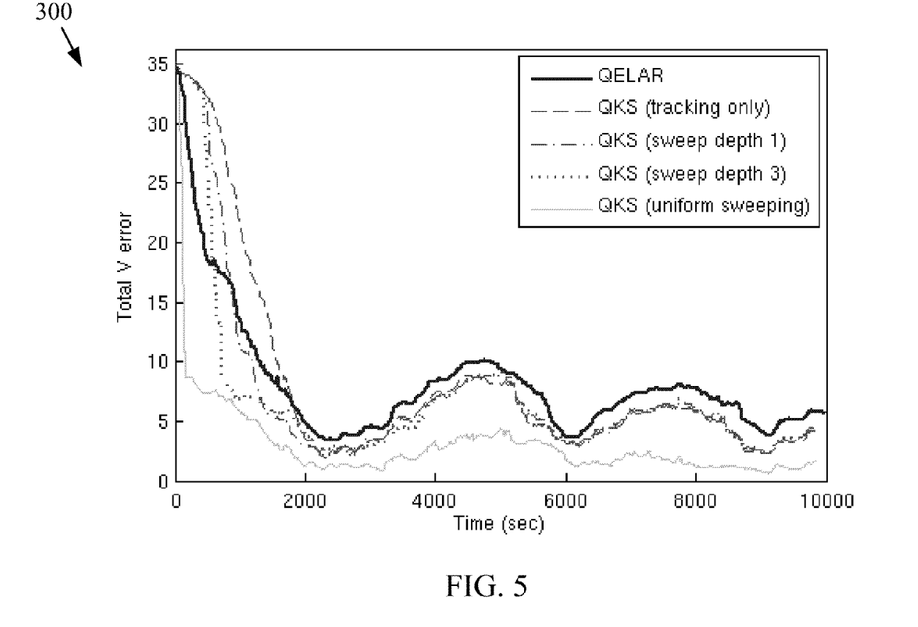
FIG. 5 shows a graph illustrating V value error for various methods for a mobile node scenario.

FIGS. 4 and 5 show the error of V value estimates at all nodes as time progresses through the simulation. The actual V values for each node are computed at each time instant, and each node's estimated V value is compared to the correct value; the deviations between these two are summed for all nodes. This provides an overall metric of how well the network as a whole has converged at any given time; note that zero-error convergence can never happen because the network is attempting to converge on a "moving target" since the V values are constantly changing. It should also be noted that some level of overall error in V value estimate in the network is not necessarily unfavorable, because if nodes are not located along a path used to get to the destination, it may be acceptable to let their V estimates be inaccurate and not waste resources updating them. However, this metric still gives valuable insight into routing performance.

For the static case (see FIG. 4), almost identical performance between the two algorithms is observed, as was evidenced from the metrics. In the mobile case (see FIG. 5), more significant differences are observed. While the QELAR algorithm converges faster, this is due to initial packets doing more "exploration" of the network due to inaccurate knowledge of the network, and thus more nodes change their V values sooner.

As can be seen from FIG. 9, the UUV (destination) begins close to the source node in the mobile case, and thus packets do not need to venture far into the network to reach it. Thus, the QKS algorithm is actually performing better by not sending packets throughout the network, which has the side effect that these nodes do not converge in V value until later in the scenario. Also note that increasing the backward sweeping increases the V convergence by essentially carrying out more exploration, even to the point where it exceeds the QELAR algorithm, yet is able to maintain better energy performance at the same time due to the efficient use of the sweeping packets.

The more significant effect observed is the two humps around 4500 seconds and 7500 seconds, which correspond to times when the UUV leaves the node field. It is noted that the tracking alone helps with maintaining good estimates during this time over the QELAR algorithm, with selective sweeping helping even further. In fact, with uniform sweeping, the fastest initial convergence and lowest error during the remainder of the simulation of any of the algorithms is observed.

Figure 6:
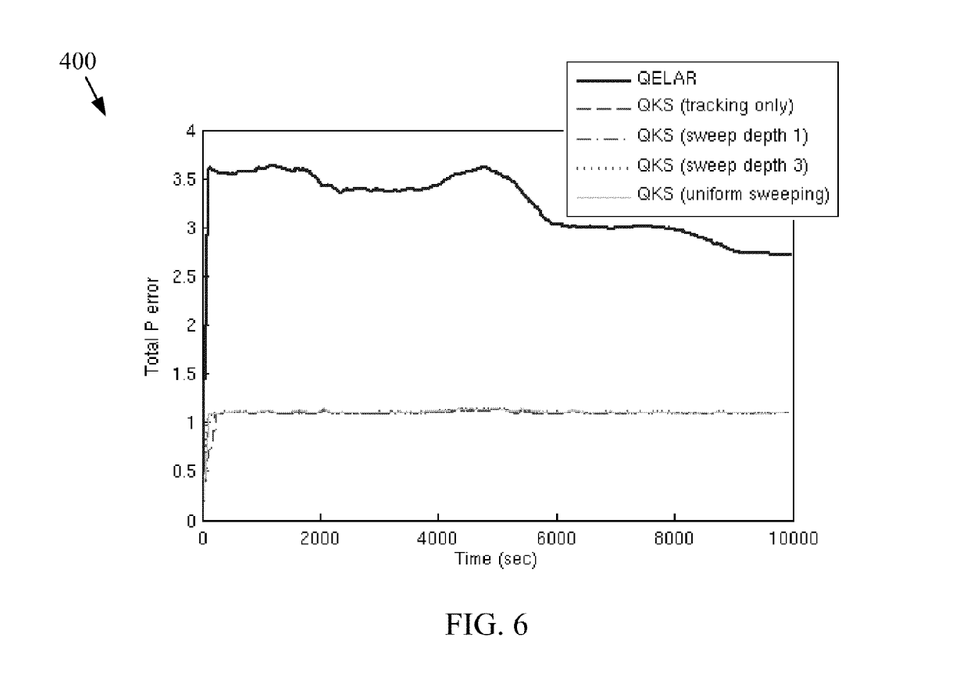
FIG. 6 shows a graph illustrating P value estimate error versus time for various methods for a mobile node scenario.

The accuracy of the P value estimates (probabilities of successful transmission) of the two algorithms was also examined, as shown in FIG. 6. Only the mobile results are provided here, as the static result showed similar trends. Here, the error between the estimated P values at each node and the actual probability of successful transmission based on node distance is computed at each time instant. This shows most clearly, perhaps, the benefit of the modified algorithm: all four implementations show distinct improvement over QELAR in terms of ability to track the continually changing P values due to estimating neighboring node kinematic states and tracking their position between communications with them. This improved ability to estimate transmission probabilities is primarily due to the kinematic tracking component of the algorithm and therefore we see little difference between the selective sweeping levels used. The lower value of P error is one factor influencing the reduced V value error examined above.

Figure 7:
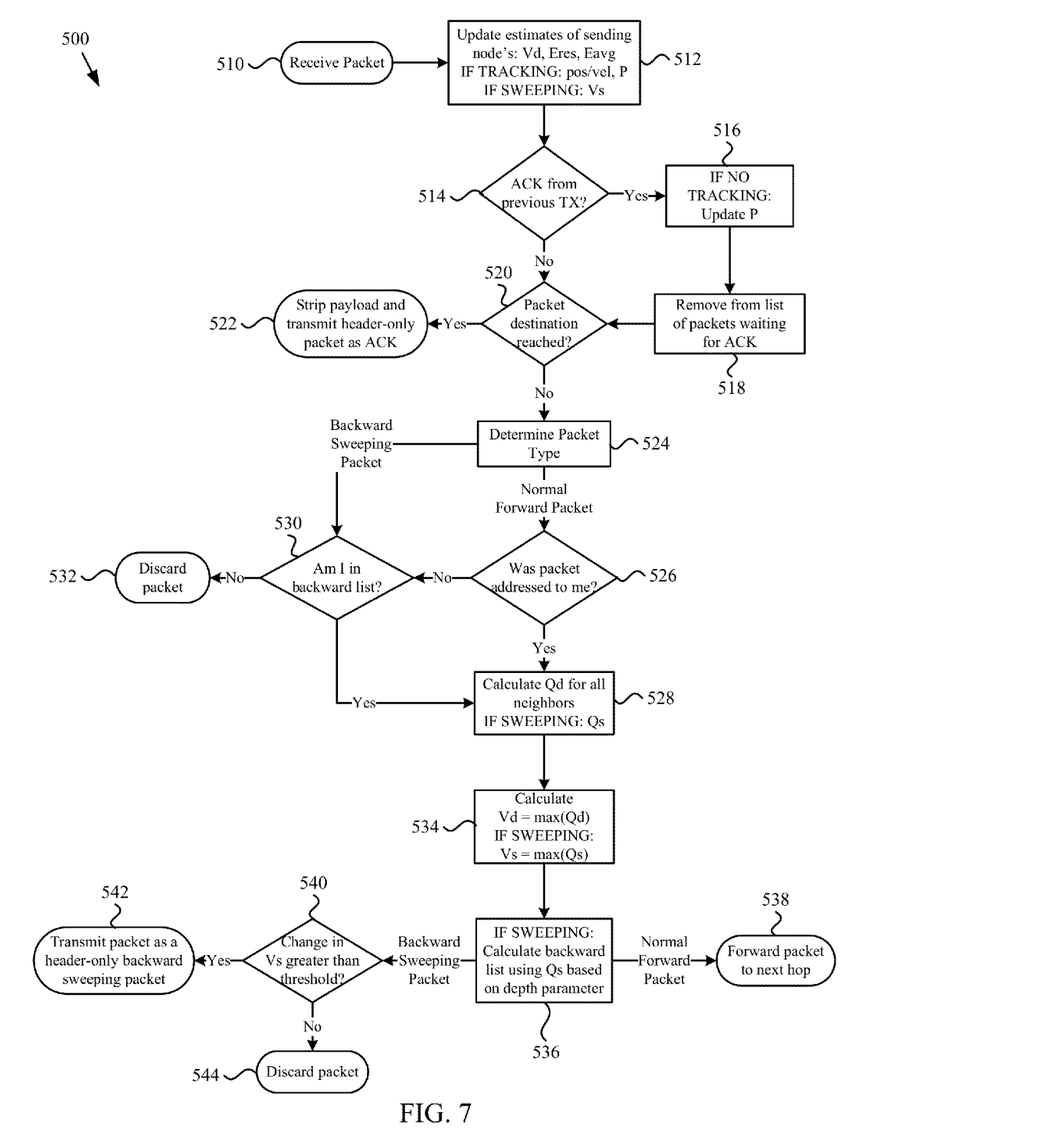
FIG. 7 shows a flowchart of an embodiment of a method in accordance with the Reinforcement Learning-Based Distributed Routing Method for Underwater Networks Utilizing Integrated Tracking and Selective Sweeping.

FIG. 7 shows a flowchart of an embodiment of a method 500 in accordance with the Reinforcement Learning-Based Distributed Routing Method for Underwater Networks Utilizing Integrated Tracking and Selective Sweeping. As an example, method 500 may be performed by system 10 as shown in FIG. 1 and its respective components, which are shown operationally in FIGS. 8A-8F. As such, method 500 will be discussed with reference to network 600 shown in FIGS. 8A-8F.

Further, while FIG. 7 shows one embodiment of method 500 to include steps 510-544, other embodiments of method 500 may contain fewer or more steps. Also, while in some embodiments the steps of method 500 may be performed as shown in FIG. 7, in other embodiments the steps may be performed in a different order, or certain steps may occur simultaneously with one or more other steps. Method 500 may involve iteratively repeating steps 510-544 until the end of an operational scenario time window. Method 500 may include the tracking component only, sweeping component only, or both.

Figure 8A:
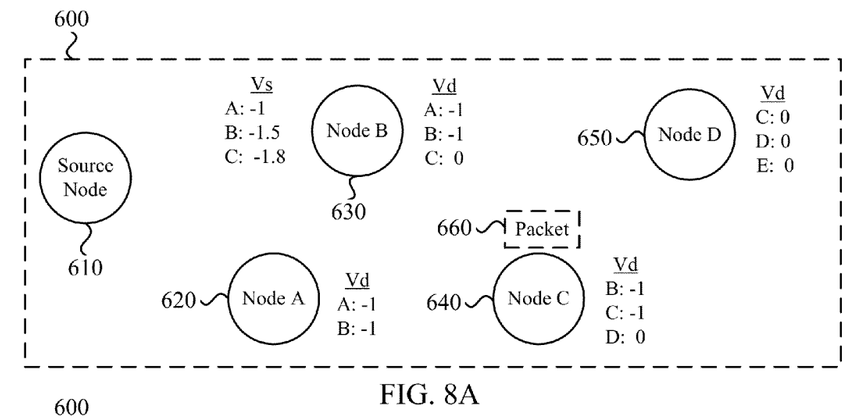
FIGS. 8A-8F show diagrams illustrating a subset of information updating at various nodes in response to receiving a packet and forwarding of a selective sweeping packet, in accordance with embodiments of the Reinforcement Learning-Based Distributed Routing Method for Underwater Networks Utilizing Integrated Tracking and Selective Sweeping.
Figure 8B:
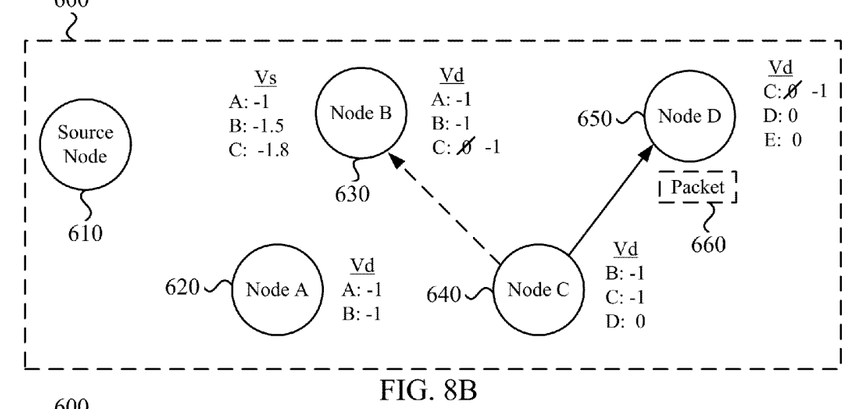

Method 500 may begin at step 510, which involves receiving a data packet, such as packet 660 shown in FIG. 8B, at a receiving node such as Node D 650. The data packet may be received from a transmitting node such as Node C 640. Data packet 660 includes a data payload and a header section, with the header section possibly including position and velocity information of the transmitting node (see Table 1). The receiving node and the transmitting node are contained within a distributed network 600 comprising a plurality of nodes, such as Nodes A-D 610-650. Because network 600 is a distributed network, there is no central processing node. Accordingly, the processing is performed by each node. One or more of Nodes A-D 610-650 are mobile nodes, meaning that the node is not fixed in position within network 600.

Each of the nodes may be configured to perform energy and/or position and velocity updating as a continuous processes, or, alternatively, update these estimates upon receipt of a packet. Further, source nodes, such as node 610 shown in FIGS. 8A-8F, may be configured to periodically generate and transmit new data packets within network 600.

Step 512 may then involve updating estimates of the transmitting node's residual energy, average energy, and $V_d$, using the information received. If method 500 involves tracking, the position and velocity of the transmitting node are also obtained and are used to update the receiving node's P estimate for this neighbor. Further, if backward sweeping is performed, $V_s$ is updated for the transmitting node.

Step 514 then involves determining whether the packet received is an acknowledgement from a previous transmission by the receiving node. The receiving node may make this determination by maintaining a list of packets it has transmitted and is waiting for acknowledgement for. It can then compare the packet ID and previous hop fields to determine if the received packet matches any previously transmitted packets. If the packet is an acknowledgement and the receiving node is not involved in tracking, step 516 involves adding a success to the transmission history of this node pair and updating P using the baseline method (ratio of previous successes to failures).

Method 500 may then proceed to step 518, which involves removing the packet received from the list of packets waiting for an acknowledgement. Following step 518, or if the determination at step 514 indicates that an acknowledgement packet has not been received, step 520 involves a determination as to whether the packet end destination was reached. The receiving node may make this determination by comparing the destination ID field in the packet header to the receiving node's own ID. If the end destination was reached, step 522 involves stripping the payload from the packet and transmitting a header-only packet as an acknowledgement to the transmitting node. If the destination has not been reached, method 500 proceeds to step 524.

Step 524 involves determining the packet type received—either a forward packet or a backward sweeping packet. The receiving node is able to determine which type of packet was received by examining the next hop field in the packet header. This field may be overloaded to indicate the type of packet when next hop does not need to be indicated (e.g. ACK packets, sweeping packets, periodic transmissions (QELAR) etc.) If a forward packet was received, step 526 involves determining whether the packet was addressed to the receiving node. The receiving node may make this determination by examining the packet address information contained in the packet header section.

If the packet was addressed to the receiving node, step 528 involves calculating $Q_d$ (using Eq. (2)) for all neighbor nodes of the receiving node to determine which neighbor node to which the packet will be forwarded. Additionally, if sweeping is being performed, step 528 also involves calculating $Q_s$ (using Eq. (2)) for inclusion in the header information to determine which neighbor node(s) to which backward packets will be sent. If at step 524 it was determined that a backward sweeping packet was received, step 530 involves determining whether the receiving node is in the backward sweeping list of the packet. The receiving node can make this determination by examining the backward sweeping list information contained in the packet header section. If the receiving node is not within the backward sweeping list, step 532 involves the receiving node discarding the packet. If the receiving node is within the backward sweeping list, method 500 proceeds to step 528, where $Q_d$ and $Q_s$ are computed (using Eq. (2)).

Following step 528, step 534 involves calculating $V_d$ (using Eq. (1)) and $V_s$ (using Eq. (1)) if backward sweeping is being performed, where $V_d$ is associated with the neighbor node having the maximum $Q_d$ value and $V_s$ is associated with the neighbor node having the maximum $Q_s$ value. For forward packets, method 500 may skip directly to step 538, which involves forwarding the packet to the neighbor node associated with $V_d$. Method 500 will then iterate with the neighbor node receiving the packet at step 510 and so forth.

For backward sweeping packets, method 500 proceeds from step 534 to step 536, which involves determining the list of backward sweeping nodes using the $Q_s$ values and a predetermined depth parameter. The depth parameter is the number of neighbor nodes to which the backward sweeping packet is sent. For example, if the receiving node has four neighbors and the depth parameter is two, the two neighbor nodes having the highest $Q_s$ values will be on the list to receive the backward sweeping packet. Given that the receiving node transmits uni-directionally, all four neighbor nodes will receive the backward sweeping packet, but since only two will be on the list, the two neighbor nodes that are not on the list will simply discard the packet, as in step 532.

Following step 536, step 540 involves determining if a change in source-direction state value function ($V_s$) estimate for the receiving node exceeds a predetermined threshold. The change is determined by comparing the new $V_s$ with the previous $V_s$ estimate for the receiving node. If the change is greater than the threshold, step 542 involves forwarding the (header-only) backward sweeping packet to one or more neighbor nodes according to the $Q_s$ values computed in step 528. Method 500 will then iterate with the neighbor node receiving the backward sweeping packet at step 510 and so forth. If at step 540 the change is not greater than the threshold, step 544 involves discarding the packet.

Method 500 may be implemented as a series of modules, either functioning alone or in concert with physical electronic and computer hardware devices. Method 500 may be implemented as a program product comprising a plurality of such modules, which may be displayed for a user. As used herein, the term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Such modules may be utilized separately and/or together locally and/or remotely to form a program product thereof, that may be implemented through non-transitory machine readable recordable media.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

FIGS. 8A-8F show diagrams illustrating information updating at various nodes in response to receiving a packet in accordance with embodiments of the Reinforcement Learning-Based Distributed Routing Method for Underwater Networks Utilizing Integrated Tracking and Selective Sweeping. As shown, network 600 includes a Source Node 610, Node A 620, Node B 630, Node C 640 and Node D 650. Each node, maintains information about its own V values as well as the V values of the other nodes. For example, Node B 630 estimates the $V_d$ of Node A 620 to be −1, its own $V_d$ to be −1, and the $V_d$ of Node C 640 to be 0. It should be noted that the V value information shown for each node is for illustrative purposes only. Further, each node may update information other than V value such as position, velocity, residual energy, and average energy.

Figure 8C:
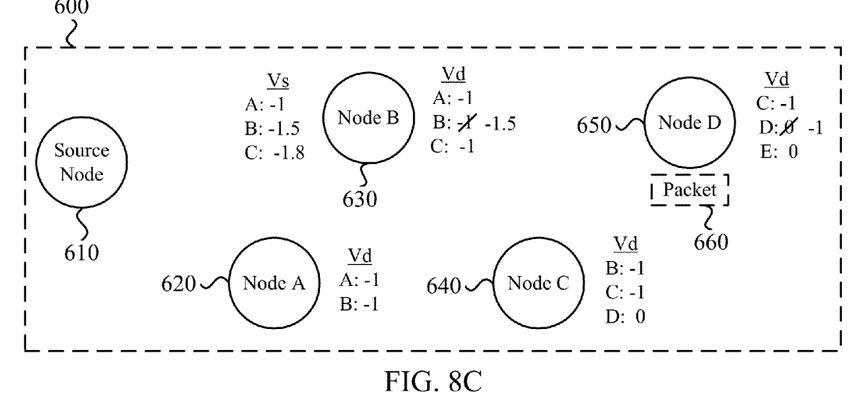

A Packet 660 is contained within network 600 and resides at Node C 640 in FIG. 8A. Packet 660 includes data that has been originated at a source node and is intended to be delivered to a destination node. For example, Packet 660 may have been generated at Source Node 610 and may have reached Node C 640 via either Node A 620 or Node B 630. As shown in FIG. 8B, Packet 660 has been sent from Node C 640 to Node D 650. However, as each of the nodes transmits omni-directionally, Node B 630 overhears the transmission of Packet 660 to Node D 650. In response to the receipt of Packet 660, Node B 630 and Node D 650 update their estimates of the transmitting node (Node C 640). Following this, and as shown in FIG. 8C, Node B 630 and Node D 650 use this information to compute their own new $V_d$ values (using Eq. (2) and (3)).

Figure 8D:
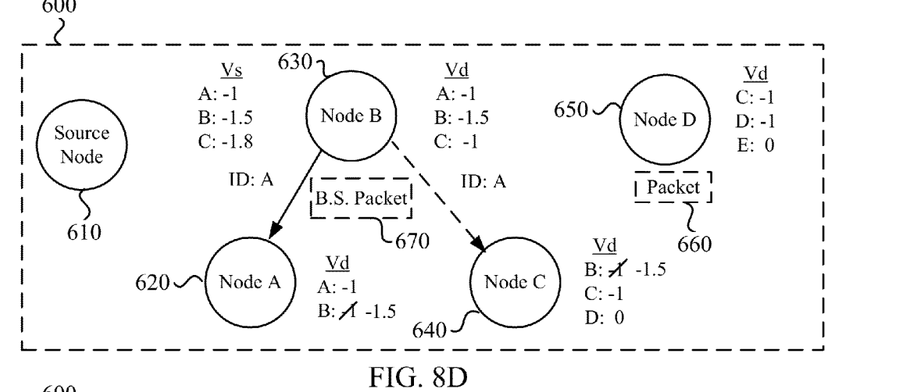
Figure 8E:
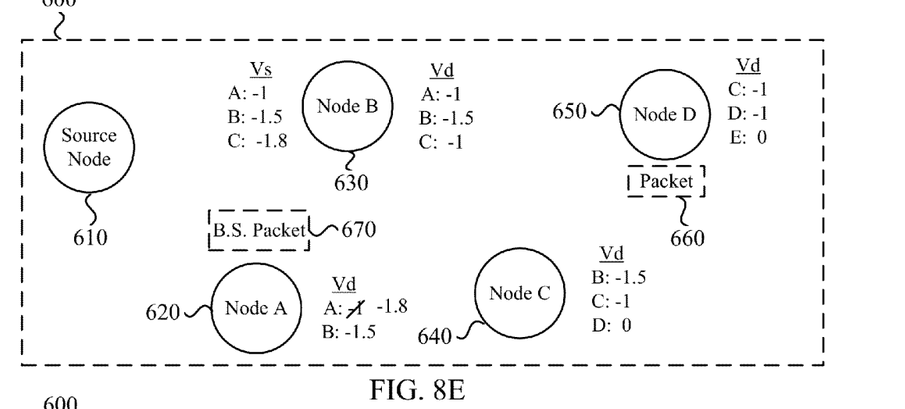
Figure 8F:
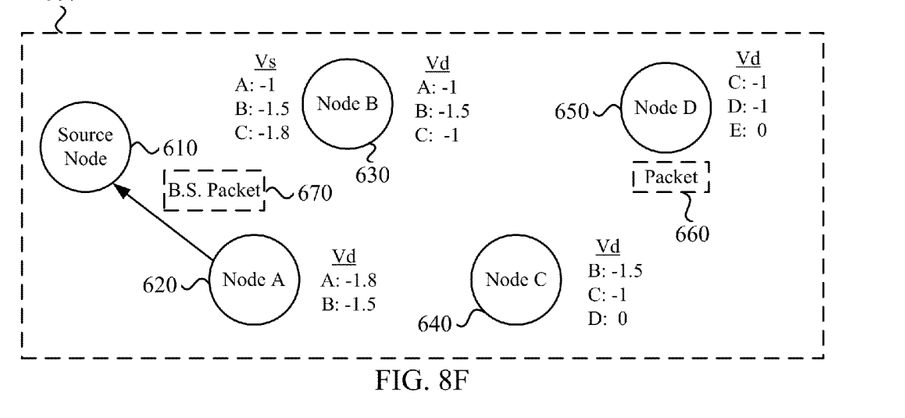

Assuming the change in $V_d$ at Node B 630 (0.5) exceeds the predefined threshold, Node B 630 now initiates a backward sweeping Packet 670 in order to share this change with its neighbor nodes (FIG. 8D). Assuming the backward sweeping depth parameter is 1, it will direct Packet 670 to Node A 620 only, since Node B 630 estimates Node A 620 to have the maximum $V_s$ value (−1). We observe that this is expected, since Node A 620 is closest to the Source Node 610. Node A 620 and Node C 640 both overhear this transmission, and utilize the information in the header to update their estimates of Node B 630. In FIG. 8E, Node A 620 updates its own $V_d$ estimate to −1.8 based upon the information obtained from Node B 630 since it is the addressed node. Assuming once again that this change in $V_d$ value exceeds the predefined threshold, Node A 620 then transmits the backward sweeping Packet 670 towards Source Node 610, as shown in FIG. 8F. Node C 640 discards the packet instead of transmitting because it was not addressed in the backward sweeping list by Node B 630. In some embodiments, Packet 670 only contains the header information shown in Table 1 and does not include a data payload.

Many modifications and variations of the Reinforcement Learning-Based Distributed Routing Method for Underwater Networks Utilizing Integrated Tracking and Selective Sweeping are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A method comprising the steps of:
   receiving, at a receiving node, a data packet from a transmitting node, the data packet comprising a data payload and a header section including position and velocity information of the transmitting node, wherein the receiving node and the transmitting node are contained within a distributed network comprising a plurality of nodes, wherein one or more of the plurality of nodes are mobile nodes; and
   at the receiving node, updating a position and velocity estimate for the receiving node as well as a position and velocity estimate for the transmitting node using the position and velocity information contained in the data packet, determining that the data packet has not reached its destination, determining a state-action pair value for each neighbor node of the receiving node, wherein the state-action pair value for each neighbor node of the receiving node is a source-direction state-action pair value, $Q_s$, determining a current source-direction state value estimate, $V_s$, wherein $V_s$ is associated with the neighbor node having the maximum $Q_s$, determining a list of backward sweeping nodes using the $Q_s$ values and a predetermined depth parameter, and forwarding the header section of the data packet to one or more neighbor nodes, depending upon the $Q_s$ value associated with the one or more neighbor nodes, as a backward sweeping packet.

2. The method of claim 1 further comprising the step of, at the receiving node, prior to forwarding the header section of the data packet, determining a current destination-direction state value estimate, $V_d$, wherein $V_d$ is associated with the neighbor node having the maximum $Q_d$.

3. The method of claim 2 further comprising the step of, at the receiving node, prior to forwarding the header section of the data packet, determining a change in destination-direction state value function estimate for the receiving node using a previous value function estimate for the receiving node and $V_d$, and determining that the change in destination-direction state value function estimate exceeds a predetermined threshold.

4. The method of claim 1, wherein the position and velocity estimate for the receiving node and the position and velocity estimate for transmitting node is updated using historic position data, historic velocity data, and header information from the data packet.

5. A system comprising:
   a distributed network comprising a plurality of nodes, wherein one or more of the plurality of nodes are mobile nodes, each node configured to receive a data packet from the other plurality of nodes, each data packet comprising position data and velocity data of the node that transmitted the data packet, wherein each node comprises a processor operatively connected to a transceiver, wherein each processor contains instructions therein to cause the processor to, upon each respective node receiving the data packet, update a position and velocity estimate for the receiving node, update a position and velocity estimate for the transmitting node using the position and velocity information, determine that the data packet has not reached its destination, determine a state-action pair value for each neighbor node of the receiving node, wherein the state-action pair value for each neighbor node of the receiving node is a source-direction state-action pair value, $Q_s$, determine a current source-direction state value estimate, $V_s$, wherein $V_s$ is associated with the neighbor node having the maximum $Q_s$, determine a list of backward sweeping nodes using the $Q_s$ values and a predetermined depth parameter, and forward the header section of the data packet to one or more neighbor nodes, depending upon the $Q_s$ value associated with the one or more neighbor nodes, as a backward sweeping packet.

6. The system of claim 5, wherein each processor further contains instructions therein to cause the processor to, prior to forwarding the header section of the data packet, determine a change in destination-direction state value function estimate for the receiving node using a previous value function estimate for the receiving node and a current destination-direction state value estimate, $V_d$, and determine that the change in destination-direction state value function estimate exceeds a predetermined threshold.

7. A non-transitory computer readable storage medium having a method encoded thereon, the method represented by computer readable programming code, the method comprising the steps of:

upon receipt, at a receiving node, of a data packet from a transmitting node, the data packet comprising a data payload and a header section including position and velocity information of the transmitting node, updating a position and velocity estimate for the transmitting node and a position and velocity estimate for the receiving node using the position and velocity information, determining that the data packet has not reached its destination, and determining a state-action pair value for each neighbor node of the receiving node;

for data packets that are backward sweeping packets and state-action pair values for each neighbor node of the receiving node comprising a source-direction state-action pair value, $Q_s$, determining a current source-direction state value estimate, $V_s$, wherein $V_s$ is associated with the neighbor node having the maximum $Q_s$, determining a list of backward sweeping nodes using the $Q_s$ values and a predetermined depth parameter, determining a change in destination-direction state value function estimate for the receiving node using a previous value function estimate for the receiving node and a current destination-direction state value estimate, $V_d$, determining that the change in destination-direction state value function estimate exceeds a predetermined threshold, and forwarding the header section of the data packet to one or more neighbor nodes depending upon the $Q_s$ value associated with the one or more neighbor nodes; and for data packets that are forward packets and the state-action pair value for each neighbor node of the receiving node comprising a destination-direction state-action pair value, $Q_d$, determining a current destination-direction state value estimate, $V_d$, wherein $V_d$ is associated with the neighbor node having the maximum $Q_d$, and forwarding the data packet to the neighbor node having $V_d$ associated therewith.

\* \* \* \* \*